United States Patent
deVos et al.

(10) Patent No.: US 7,544,431 B2
(45) Date of Patent: Jun. 9, 2009

(54) REGULATED HYDROGEN PRODUCTION SYSTEM

(75) Inventors: John A deVos, Corvallis, OR (US); Louis Barinaga, Salem, OR (US); Suraj L Hindagolla, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1208 days.

(21) Appl. No.: 10/412,569

(22) Filed: Apr. 10, 2003

(65) Prior Publication Data

US 2004/0202903 A1    Oct. 14, 2004

(51) Int. Cl.
*H01M 8/04*    (2006.01)

(52) U.S. Cl. ............... 429/17; 429/19; 429/25; 422/112; 48/61

(58) Field of Classification Search ............ 429/12, 429/17, 19, 20, 21; 422/112; 48/61
See application file for complete search history.

(56) References Cited

U.S. PATENT DOCUMENTS

| | | | |
|---|---|---|---|
| 3,607,066 A * | 9/1971 | Basch et al. ......... 423/579 |
| 4,018,190 A | 4/1977 | Henault |
| 4,155,712 A | 5/1979 | Taschek |
| 5,702,491 A | 12/1997 | Long et al. |
| 2003/0009942 A1 * | 1/2003 | Amendola et al. ........ 48/61 |

FOREIGN PATENT DOCUMENTS

| | | |
|---|---|---|
| EP | 1170249 A1 | 1/2002 |
| EP | 1329972 B1 | 6/2005 |
| GB | 1230616 | 5/1971 |
| WO | WO 01/74710 A1 | 10/2001 |
| WO | WO 03/006150 A1 | 1/2003 |
| WO | WO 09/006366 A1 | 1/2003 |

* cited by examiner

*Primary Examiner*—Patrick Ryan
*Assistant Examiner*—Ben Lewis (57) ABSTRACT

A production system includes a reaction chamber having an inlet and outlet, a gas collection chamber coupled with the reaction chamber and a regulator coupled to the gas collection chamber. The regulator controls the flow of reactant to the reaction chamber in response to the pressure in the gas collection chamber.

26 Claims, 11 Drawing Sheets

REGULATED HYDROGEN PRODUCTION SYSTEM

BACKGROUND

With the advent of portable computing and hand held communication devices there is a need for clean and portable energy sources. The increased functionality and "on time" of these devices represents a challenge for traditional battery technology. Current rechargeable battery systems have significant limitations in the areas of specific energy (watt-hours/kilogram) and energy density (watt-hours/liter).

Fuel cells offer an attractive alternative to rechargeable batteries for portable applications, offering significant performance advantages over current Li-ion cells. One of the most promising fuel cell technologies is a proton exchange membrane (PEM) fuel cell, which oxidizes hydrogen to produce electricity and water.

Figure 1:
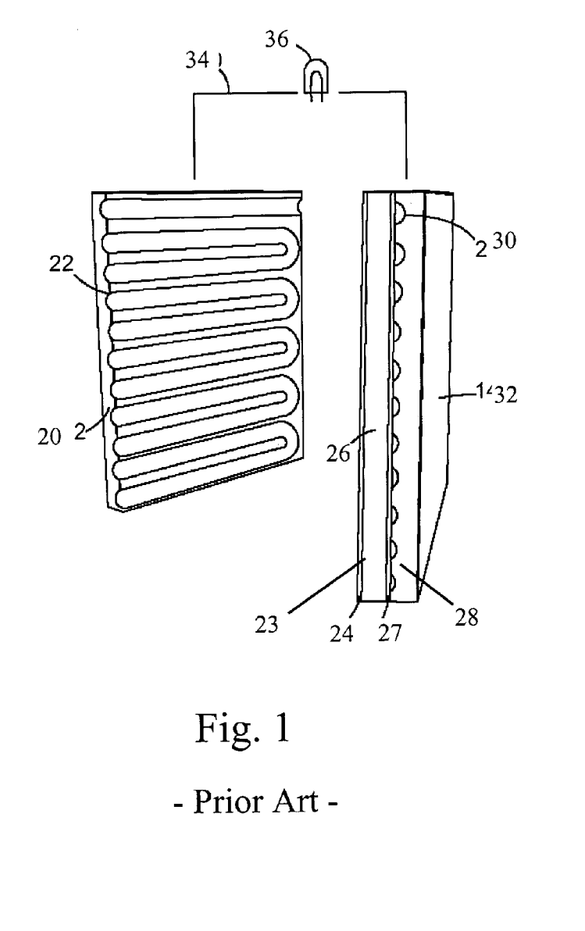
FIG. 1 illustrates a cross-sectional perspective view of a proton exchange membrane fuel cell.

Referring to FIG. 1, a PEM fuel cell typically includes a positive bus plate 20, an airframe 22, a cathode 23, a proton exchange membrane 26 with a catalyst layers 24 and 27 on opposing surfaces, an anode 28, a hydrogen frame 30 and a negative bus plate 32. The PEM fuel cell operates by introducing hydrogen gas at the hydrogen frame 30, the hydrogen molecules contact the catalyst 27 giving up electrons and forming hydrogen ions. The electrons travel to the cathode 23 by flowing through the anode 28, the negative bus plate 32, an external circuit 34 and the positive bus plate 20. The electrical current produced by the reaction can be used to power portable electrical devices 36 such as a laptop computers, digital cameras, personal digital assistants or hand held power tools.

The proton exchange membrane 26 allows protons to flow through, but stops electrons from passing through it. As a result, while the electrons flow through the external circuit 34, the hydrogen ions flow directly through the proton exchange membrane 26 to the cathode 23, where they combine with the oxygen molecules and the electrons to form water. The chemical equations look like the following:

Anode: $H_2 \rightarrow 2H^+ + 2e^-$

Cathode: $O_2 \rightarrow 2O^-$

Overall: $2H^+ + O^- \rightarrow H_2O$

When an $H_2$ molecule comes in contact with the catalyst 27 preferably platinum, it splits into two $H^+$ ions and two electrons ($e^-$). On the cathode side of the fuel cell, oxygen gas ($O_2$) is forced through the catalyst 24, where it forms two oxygen atoms. Each of these oxygen atoms has a strong negative charge, which attracts the two $H^+$ ions through the PEM 26 and combines with two of the electrons from the external circuit to form a water molecule ($H_2O$).

It should be recognized that the power demands of portable electrical devices vary over time and to operate efficiently the output of the fuel cell must be regulated to match these needs. Therefore a need exists for a method and apparatus to regulate the power produced by a fuel cell to meet the variable energy needs of portable electrical devices.

SUMMARY

A production system comprising a reaction chamber having an inlet and outlet, a gas collection chamber coupled with the reaction chamber and a regulator coupled to the gas collection chamber. The regulator controls the flow of reactant in response to the pressure in the gas collection chamber.

BRIEF DESCRIPTION OF THE DRAWINGS

The principles described herein are better understood with reference to the following drawings. The elements illustrated in the drawings are not necessarily to scale.

DETAILED DESCRIPTION OF THE EMBODIMENTS

One method of regulating the power produced by a fuel cell is to regulate the supply of fuel to the cell. This can be accomplished by either regulating the flow of fuel to the cell with a valve or other regulation device or by regulating the production of fuel that is supplied to the cell. Regulating the production of the fuel supplied to the cell has a number of advantages including: increased safety, since the fuel can be stored in a stable, inert form such as $NaBH_4$; and simpler control, since it is easier to regulate the flow of an aqueous solution like $NaBH_4$ than hydrogen gas.

Figure 2:
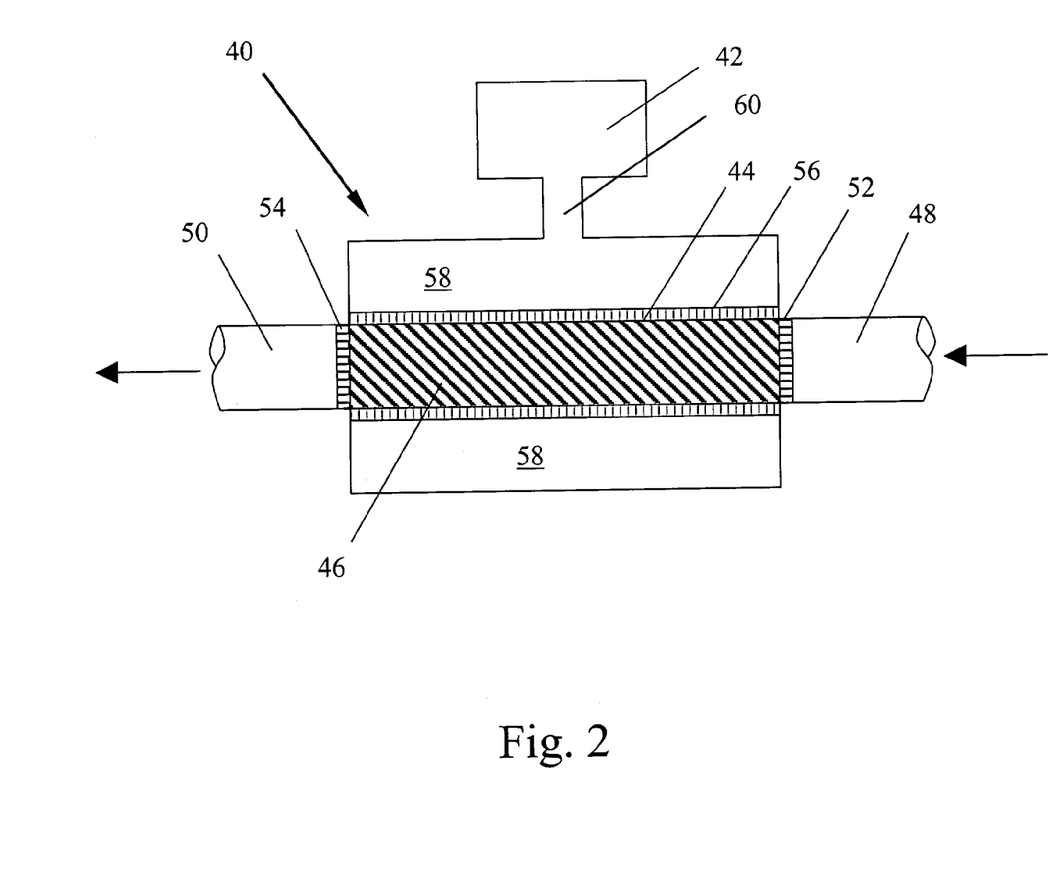
FIG. 2 illustrates a cross sectional perspective view of a hydrogen production system.

Referring to the drawings, FIG. 2 shows a hydrogen production system 40 which may provide hydrogen to the fuel cell 42 shown in FIG. 1 or other device requiring hydrogen. According to the embodiment of FIG. 2, the hydrogen production system may include a reaction chamber 44, which contains a porous catalyst 46. The catalyst 46 initiates the release of hydrogen gas from a metal hydride solution, such as $NaBH_4$ and may include materials such as ruthenium, platinum, nickel or other catalyst material known to those with skill in the art. An aqueous sodium borohydride solution in the presence of a catalyst 46 results in the release of hydrogen gas according to the following chemical reaction:

$NaBH_4 + 2H_2O \rightarrow 4H_2 + NaBO_2$

The reaction chamber 44 receives the fuel source, such as sodium borohydride, through an inlet 48 and discharges the reaction and waste products through an outlet 50. Located at the reaction chamber inlet 48 and outlet 50 are hydrophilic screens 52 and 54 which allow the passage of liquids, but prohibit the passage of gases via capillary resistance. The reaction chamber 44 also includes a hydrophobic membrane 56 that surrounds the porous catalyst 46 or alternatively lines the reaction chamber 44. The hydrophobic membrane 56, selectively allows the passage of gases, but prevents the passage of liquids through the membrane. The selection of the hydrophilic screens 52 and 54 and the hydrophobic membrane 56 defines the paths for the liquid and gas products produced by the reaction between the porous catalyst 46 and sodium borohydride solution.

The hydrogen production system 40 also includes a gas collection chamber 58, which is adjacent to or surrounds the reaction chamber 44. In one embodiment, the gas collection chamber 58 surrounds or encompasses the reaction chamber 46, providing the maximum surface area for the hydrophobic membrane 56 and correspondingly the lowest pressure loss between the reaction and collection chambers. The hydrogen gas produced in the reaction chamber 44 passes through the hydrophobic membrane 56, enters the gas collection chamber 58 and is fed through a conduit 60 to a fuel cell 42 or device which utilizes hydrogen. To ensure the safety of this device, the hydrogen collection chamber 58 is sized in proportion to the hydrogen demands of the fuel cell 42 or device, which utilizes hydrogen. Specifically, the volume of the hydrogen collection chamber 58 is kept as small as possible to minimize the amount of hydrogen gas stored in the production system 40, which in turn reduces the risk of danger.

In an alternate embodiment, a production system (not shown) reacts a hydrogen peroxide $H_2O_2$ solution with a silver catalyst 46 in reaction chamber 44 to produce oxygen $O_2$. The hydrogen peroxide solution reacts with the silver catalyst and releases oxygen according to the following chemical reaction:

$$2H_2O_2 \rightarrow 2H_2O + O_2$$

The oxygen produced has a number of different applications. The oxygen could be supplied to the airframe 22 of a fuel cell 42, which reacts the oxygen with a fuel to produce electricity which is used to power a portable electrical device 36.

Figure 3:
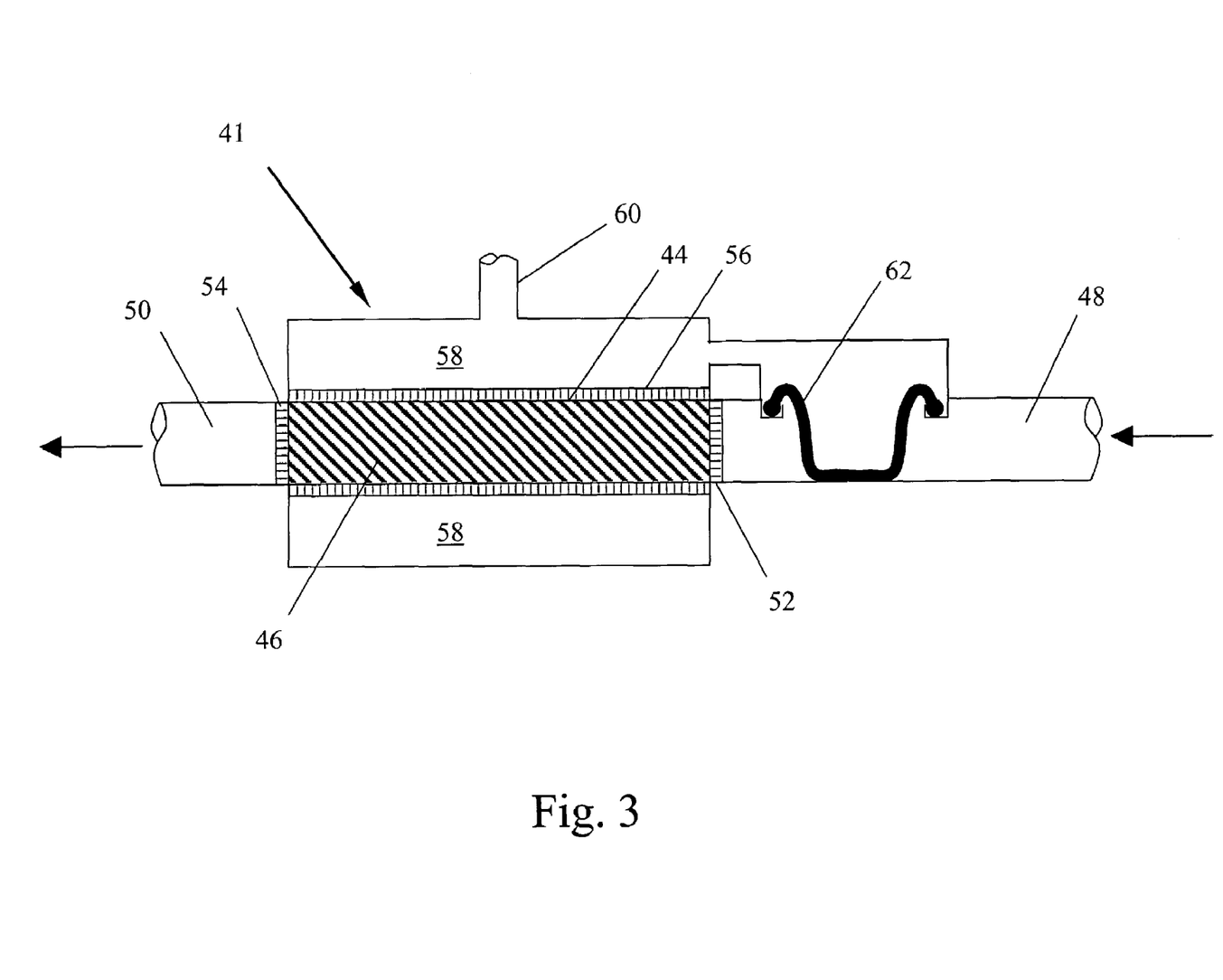
FIG. 3 illustrates a cross sectional perspective view of a hydrogen production system depicting an embodiment of the invention.

Referring now to FIG. 3, a hydrogen production system 41 according to one embodiment of the invention includes; a reaction chamber 44 having an inlet 48 and an outlet 50, a gas collection chamber 58 proximate the reaction chamber 44 and a diaphragm seal 62 that regulates the flow of fuel to the reaction chamber 56 in response to the pressure in the gas collection chamber 58. As in FIG. 2, the inlet 48 and outlet 50 have hydrophilic screens 52 and 54, the reaction chamber 44 incorporates a hydrophobic membrane 56 and a conduit 60 to direct the hydrogen gas to a fuel cell or device, which utilizes hydrogen (not shown).

The diaphragm seal 62 is designed with upper and lower regulation pressures such that when the differential pressure across the diaphragm seal is greater than an upper regulation value, the diaphragm 62 extends downward blocking the inlet 48 and preventing aqueous metal hydride solution from flowing into the reaction chamber 44. At a pressure less than the upper regulation value, the memory of the molded diaphragm seal 62 reacts against the differential pressure and the diaphragm seal 62 partially retracts, allowing a limited amount of aqueous metal hydride to flow into the reaction chamber 44. At a lower regulation value, the diaphragm seal 62 is completely retracted and the inlet 48 is unobstructed, allowing the maximum amount of aqueous metal hydride solution to flow into the reaction chamber 44.

Figure 4:
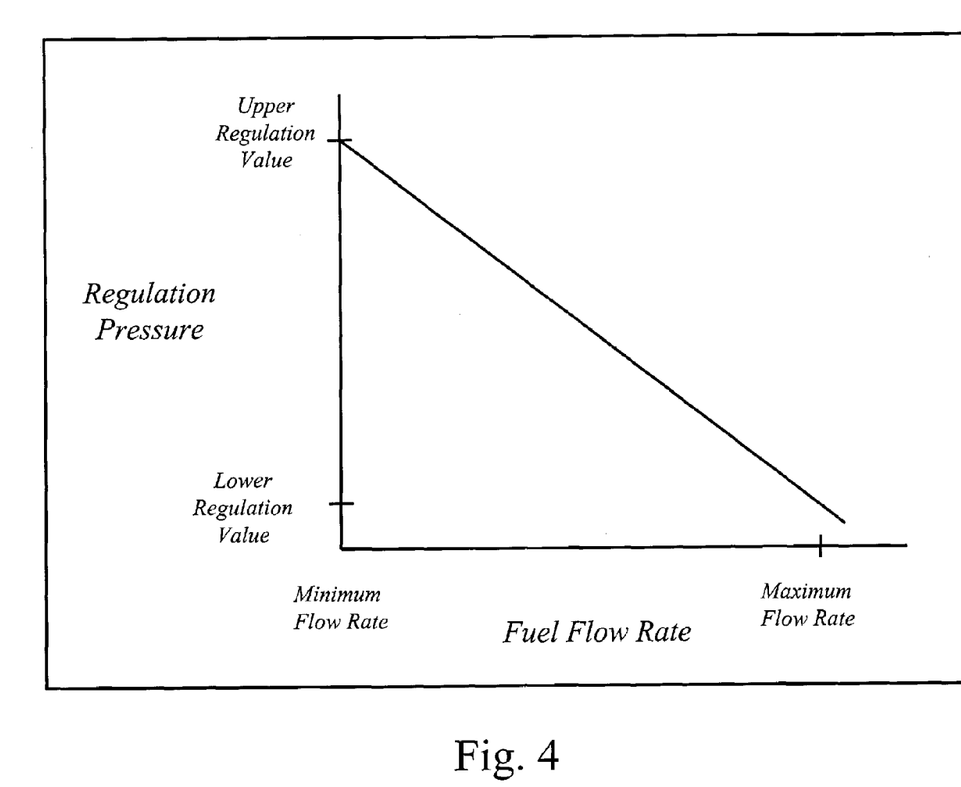
FIG. 4 illustrates a typical response curve for the hydrogen production system.

FIG. 4 depicts a typical response curve for a hydrogen production system (41, 51, 61, 71, 81, 91, 101). For portable fuel cell applications, the upper and lower regulation values are typically 5.0 and 1.0 psi. delta respectively and for large-scale commercial applications, the upper and lower regulation pressures are in the range of 100 and 20 psi delta respectively. It should be appreciated that the regulation points and shape of the response curve can be tailored based on flow requirements of the hydrogen production system. It should also be appreciated that the regulation pressure can be sensed at a number of points in the hydrogen production system (41, 51, 61, 71, 81, 91, 101) including the reaction chamber 44, reaction chamber inlet 48 and outlet 50, the gas collection chamber 58 and the conduit 60.

The regulation or upper and lower operating values of the diaphragm seal 62 are defined by the geometry of the seal, the seal material and response requirements of the system. In addition, the diaphragm seal material is selected to withstand the corrosive effects of the aqueous metal hydride solution, which for a solution of 10/10/80 (10% sodium borohydride, 10% sodium hydroxide, 80% water) has a ph of approximately 11. For some embodiments, the preferred diaphragm seal materials include ethylene propylene diene monomer (EPDM) and silicone rubbers and thermal plastic elastomers (TPE). In an alternate embodiment, the diaphragm seal 62 is placed in the outlet 50 of the hydrogen production system (embodiment not shown). In this embodiment, the diaphragm seal 62 responds to the differential pressure between the outlet 50 and the gas collection chamber 58 and regulates the out flow of the aqueous reaction products from the reaction chamber 44.

Figure 5:
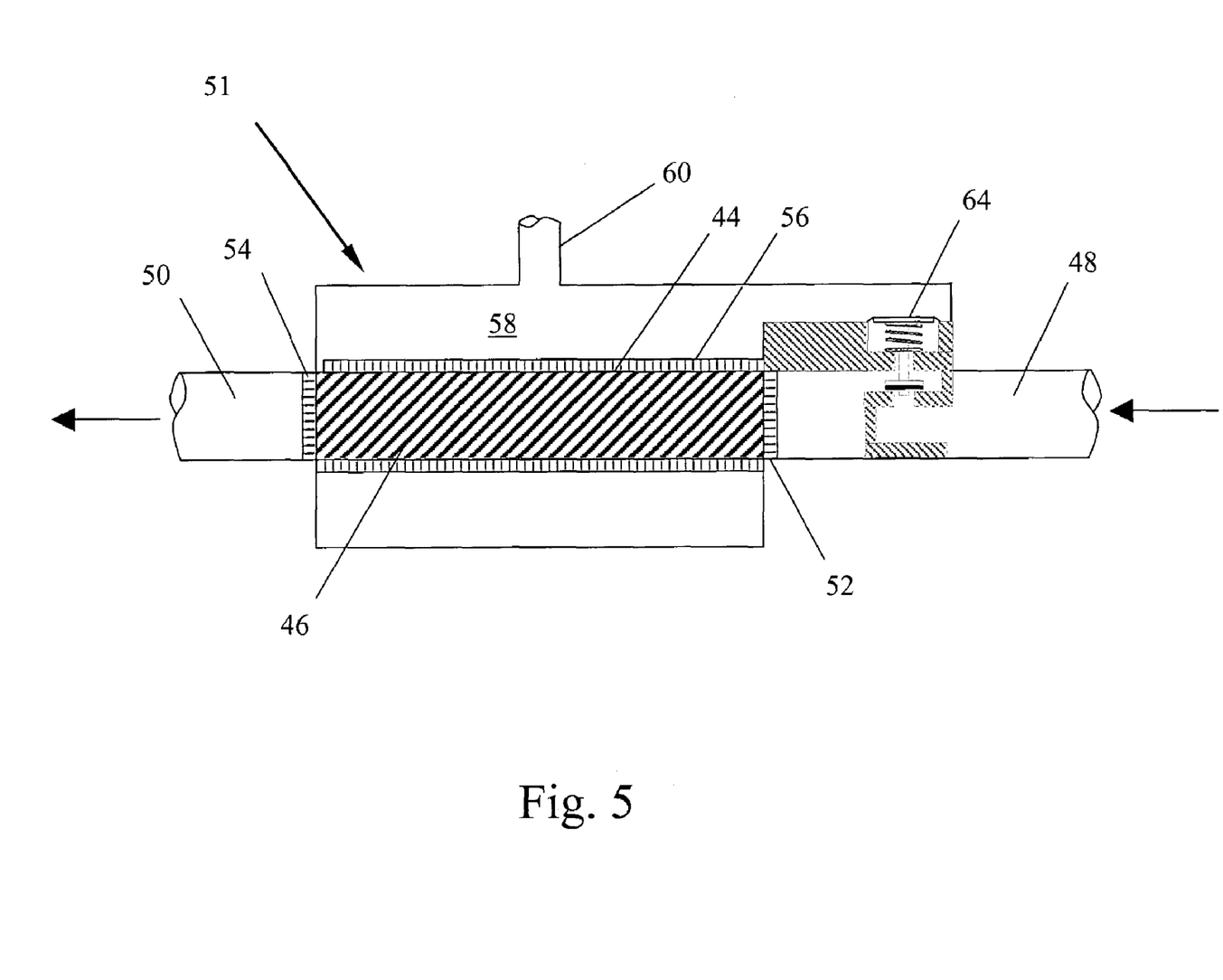
FIG. 5 illustrates a cross sectional perspective view of a hydrogen production system depicting an alternate embodiment of the invention.

FIG. 5 depicts a hydrogen production system 51 according to an alternate embodiment of the present invention. This hydrogen production system 51 includes a reaction chamber 44 with a porous catalyst 46, a gas collection chamber 58, an inlet 48 and outlet 50, a conduit 60 and a poppet valve 64 for regulating the flow of fuel to the hydrogen production system 51. The poppet valve 64 senses the differential pressure between the inlet 48 and the gas collection chamber 58. The poppet valve 64 is designed with upper and lower regulation pressures such that when the differential pressure is greater than an upper value, the poppet valve 64 fully closes, obstructing the flow of fuel to the reaction chamber 44. At a pressure less than the upper regulation pressure, the poppet valve 64 is partially open allowing a limited amount of fuel to flow into the reaction chamber 44. At the lower regulation pressure, the poppet valve 64 is fully open, allowing the maximum amount of fuel to flow into the reaction chamber 44. Those with ordinary skill in the art will recognize that the upper and lower regulation pressures are defined by the geometry of the poppet valve, the spring constant of the poppet valve, the properties of the elastomeric seals, and the response requirements of the system.

Figure 6:
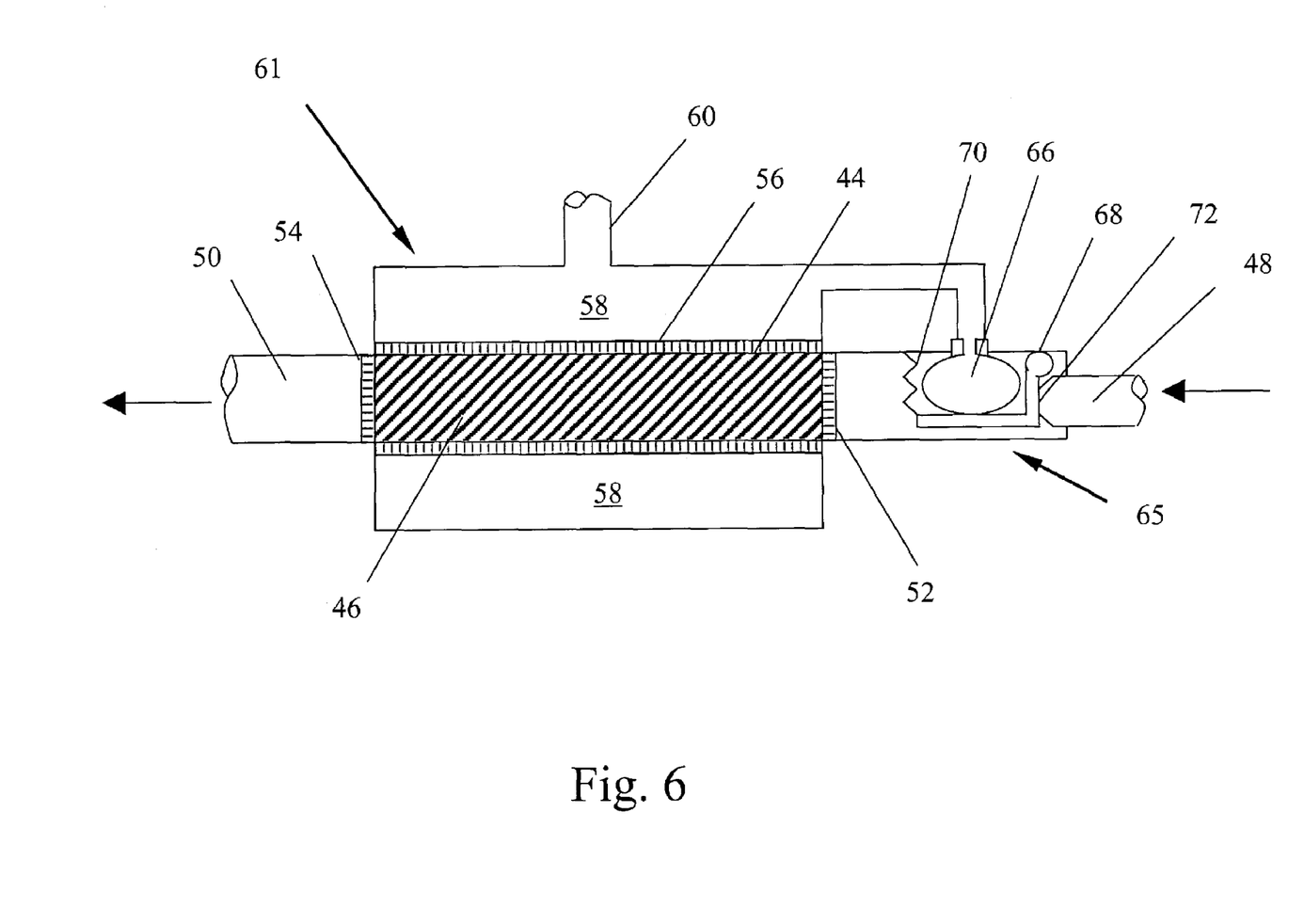
FIG. 6 illustrates a cross sectional perspective view of a hydrogen production system depicting an alternate embodiment of the invention.

FIG. 6 depicts a hydrogen production system 61 according to an alternate embodiment of the present invention. This hydrogen production system 61 includes a reaction chamber 44 with a porous catalyst 46, a gas collection chamber 58, an inlet 48 and outlet 50, a conduit 60 and a rocker valve 65 for regulating the flow of fuel to the hydrogen production system 41. A bladder 66 senses the differential pressure between the inlet 48 and the gas collection chamber 58 and expands or contracts based on that differential pressure. The bladder 66 in turn actuates a rocker arm 68, which contacts a seat 72 and regulates the flow of the fuel to the reaction chamber 44.

The rocker valve 65 is designed with upper and lower regulation pressures such that when the differential pressure is greater than an upper value, the bladder 66 fully inflates, extending the rocker arm 68 until it contacts the valve seat 72 and obstructing the flow of fuel into the reaction chamber 44.

At a pressure less than the upper regulation value, the rocker arm 68 is partially retracted by a spring 70, allowing a limited amount of fuel to flow into the reaction chamber 44. At the lower regulation value, the bladder 66 is fully retracted by the spring 70 and the valve seat 72 is completely unobstructed by the rocker arm 68 allowing the maximum amount of fuel to flow into the reaction chamber 44. Those with ordinary skill in the art will recognize that the upper and lower regulation values are defined by the geometry of the rocker arm 68, the constant of the spring 70, the geometry of the bladder 66 and the response requirements of the system. Again, the selection of materials for the bladder 66 must consider the corrosive effects of the aqueous metal hydride solution and includes Saranex 11 manufactured by Dow Chemical, polyethylene and liquid crystal polymer films. In an alternate embodiment, the rocker valve 65 is placed in the outlet 50 of the hydrogen production system (embodiment not shown). In this embodiment, the rocker valve 65 responds to the differential pressure between the outlet 50 and the gas collection chamber 58 and regulates the out flow of the aqueous reaction products from the reaction chamber 44.

Figure 7:
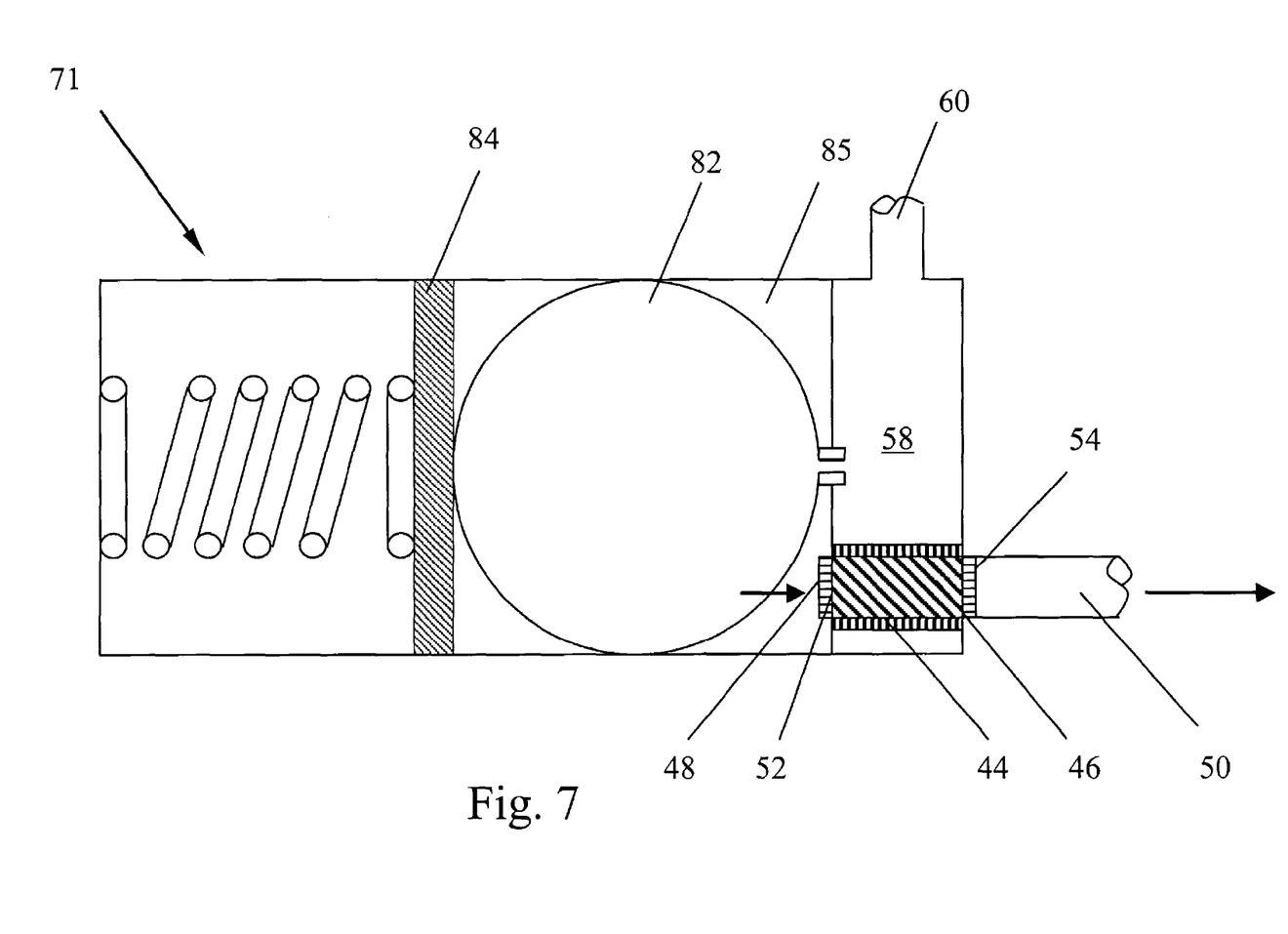
FIG. 7 illustrates a cross sectional perspective view of a hydrogen production system depicting an alternate embodiment of the invention.

Referring to now to FIG. 7, which depicts a hydrogen production system 71 according to an alternate embodiment of the present invention. This hydrogen production system 71 includes a reaction chamber 44 with a porous catalyst 46, a gas collection chamber 58 with inlet 48 and outlet 50, fuel chamber 85 with an inflatable bag 82 for regulating the flow of fuel into the reaction chamber 44 and a conduit 60 for conveying the hydrogen gas. The fuel chamber 85 contains both the fuel, such as $NaBH_4$ and an inflatable bag 82, which senses the differential pressure between the inlet 48 and the gas collection chamber 58. The bag 82 is in contact with a spring driven piston 84 and expands or contracts based on this differential pressure.

When the differential pressure between the gas collection chamber 58 and inlet 48 is greater than 5 psi, the bag 82 is fully inflated and prevents the spring driven piston 84 from displacing the fuel into the reaction chamber 44. As the differential pressure decreases, the bag 82 is partially deflated and reacts only a portion of the spring force on the fuel, providing reduced flow to the reaction chamber 44. When the differential pressure approaches 1 psi, the bag 82 reacts only a small portion of the force exerted on the fuel by the spring driven piston 84, providing a small reduction in the flow to the reaction chamber 44. The upper and lower regulation values are determined by the spring constant of the spring driven piston 84, the geometry of the inflatable bag 82 and the flow requirements of the hydrogen production system 41.

Figure 8:
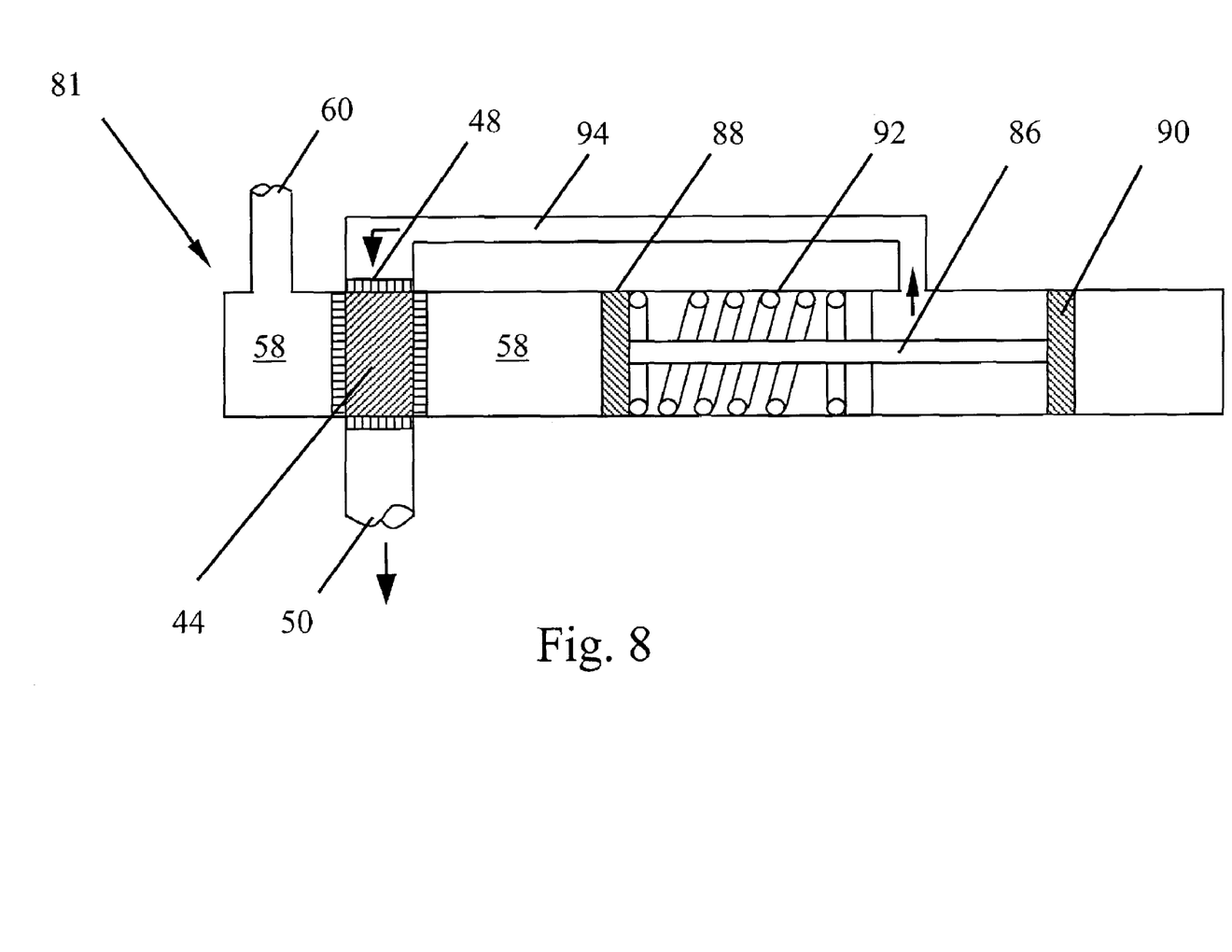
FIG. 8 illustrates a cross sectional perspective view of a hydrogen production system depicting an alternate embodiment of the invention.

FIG. 8 depicts an alternate hydrogen production system 81, in which the inflatable bag 82 and spring driven piston 84 are replaced with a double piston 86. The double piston 86 includes a first piston 88, a second piston 90 and an actuation spring 92. The double piston 86 also senses the differential pressure between the gas collection chamber 58 and inlet 48 and regulates the inflow of fuel into the reaction chamber 44. When the differential pressure between the inlet 48 and gas collection chamber 58 is greater than 5 psi, the hydrogen gas within the collection chamber 58 reacts against the first piston 88, deflecting the actuation spring 92 and preventing the second piston 90 from driving the fuel through the conduit 94 into the reaction chamber 44. As the differential pressure decreases, the hydrogen gas within the collection chamber 58 reacts with less of the an actuation force in spring 92 and the remaining force is reacted by the fuel, providing reduced flow to the reaction chamber 44. When the differential pressure approaches 1 psi, a small portion of the actuation force is reacted by the hydrogen gas and the majority of the actuation force is reacted by the fuel, providing the maximum amount of flow to the reaction chamber 44.

Figure 9:
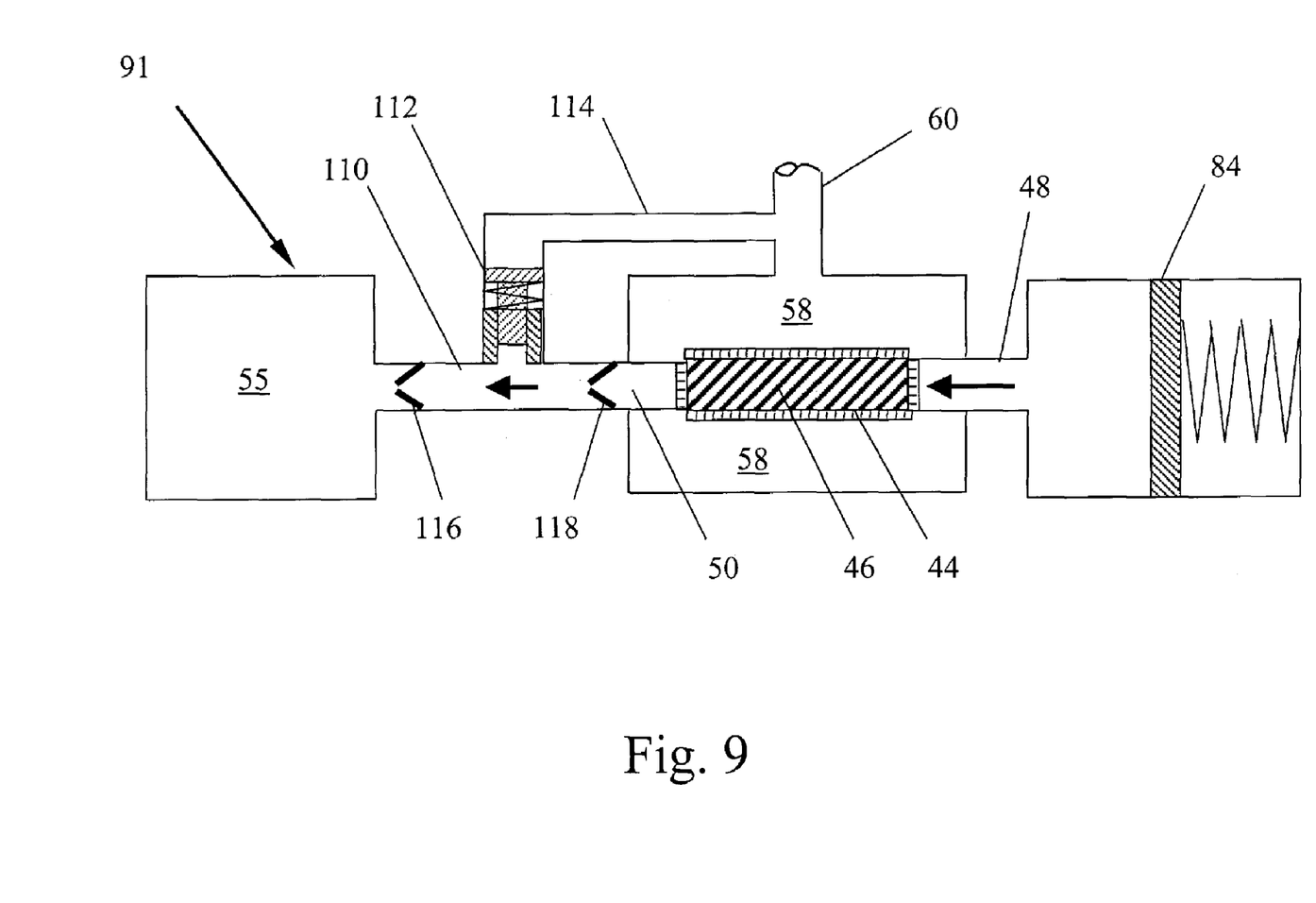
FIG. 9 illustrates a cross sectional perspective view of a hydrogen production system depicting an alternate embodiment of the invention.

FIG. 9 depicts a hydrogen production system 91 according to a further embodiment of the present invention. This hydrogen production system 91 includes a reaction chamber 44 with a porous catalyst 46, a gas collection chamber 58, an inlet 48 and outlet 50, a conduit 60, a sense line 114, a piston pump 112, check valves 116 and 118 and a spring driven piston 84. Initially, the fuel is driven into the reaction chamber 44 by the spring driven piston 84. The fuel then reacts with the porous catalyst 46, generating hydrogen gas, which passes into the gas collection chamber 58, through the conduit 60 and then to a fuel cell or device, which uses hydrogen. Reaction and waste products exit the reaction chamber 44 through a check valve 118 and enter the pump chamber 110. The piston pump 112, which has different top and bottom surface areas, moves in response to changes in the differential pressure between the conduit 114 and pump chamber 110.

At pressures above an upper threshold, the piston in the piston pump 112 moves down, forcing the waste products in the pump chamber 110 to pass through check valve 116 into the waste collection chamber 55. Simultaneously, the downward movement of the piston pump 112 causes check valve 118 to close, preventing the reaction products from back flowing into the reaction chamber 44 and preventing the flow of fresh fuel into the reaction chamber 44. This lack of fresh fuel, slows the reaction rates in the reaction chamber 44, causing the pressure to decrease, which in turn causes the piston in the piston pump 112 to move upward. At hydrogen pressures below a lower threshold, the piston in the piston pump 112 is returned to the extended position. This allows more reaction products to enter the pump chamber 110 and fuel to enter the reaction chamber 44, causing the reaction rate within the reaction chamber 44 to increase and the pressure within the collection chamber 58 and conduit 114 to rise.

Operationally, check valve 118 is designed with a cracking pressure lower than the pressure generated by the spring drive piston 84 and check valve 116 is designed with a cracking pressure higher than the pressure generated by the spring driven piston 84, but less than the pressure generated in the pump chamber 110 by the downward movement of the piston pump 112. Those with ordinary skill in the art will recognize that the upper and lower regulation pressures are defined by the geometry of the piston pump 112, the constant of the piston pump's 112 spring, the cracking pressures of the check valves (116 and 118) and the response requirements of the hydrogen production system 41. Based on these design parameters, the piston pump 112 is designed with a lower regulation pressure of 1 psi and an upper regulation pressure of 5 psi.

It should be recognized that there are several variations to the described piston pump concept including; sequenced valves, staged check valves, flexible membranes, and other compliant devices. Again, the selection of materials for the piston pump 112 must consider the corrosive effects of the aqueous metal hydride solution.

Figure 10:
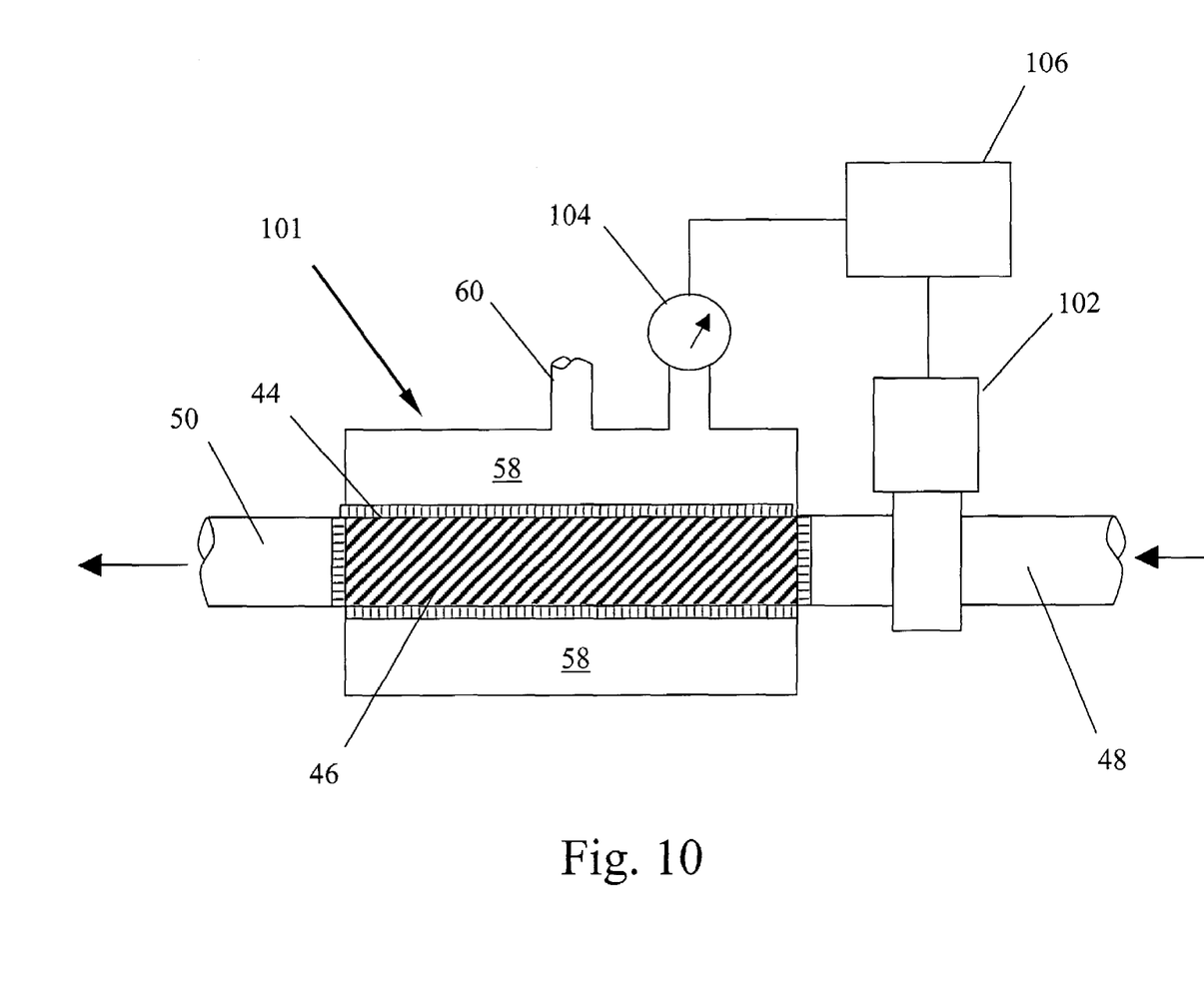
FIG. 10 illustrates a cross sectional perspective view of a hydrogen production system depicting an alternate embodiment of the invention.

FIG. 10 depicts a hydrogen production system 101 according to a further embodiment of the present invention. This hydrogen production system 101 includes a reaction chamber 44 with a porous catalyst 46, a gas collection chamber 58, an inlet 48 and outlet 50, a conduit 60 and an electromechanical valve 102 for regulating the flow of fuel to the reaction chamber 44. In this embodiment a pressure sensor 104 senses the pressure of the hydrogen gas in the gas collection chamber 58 and sends a signal to a controller 106. Based on the signal from the pressure sensor 104 the controller actuates the electromechanical valve 102 and regulates the flow of the fuel to the reaction chamber 44.

Depending on the hydrogen production system 101 requirements, the pressure sensor 104 could be referenced to atmosphere (absolute pressure sensor), the inlet pressure 48 or the outlet pressure 50. In addition, the controller 106 could be incorporated in the hydrogen production system 41, an electrical device powered by the hydrogen production system 41 or a stand-alone device. The electrical mechanical valve 102 could have a number of configurations including a ball valve, solenoid valve or rotary activated valve. In an alternate embodiment, electrical mechanical valve 102 is placed in the outlet 50 of the hydrogen production system 410 (embodiment not shown) and regulates the out flow of the reaction products.

Figure 11:
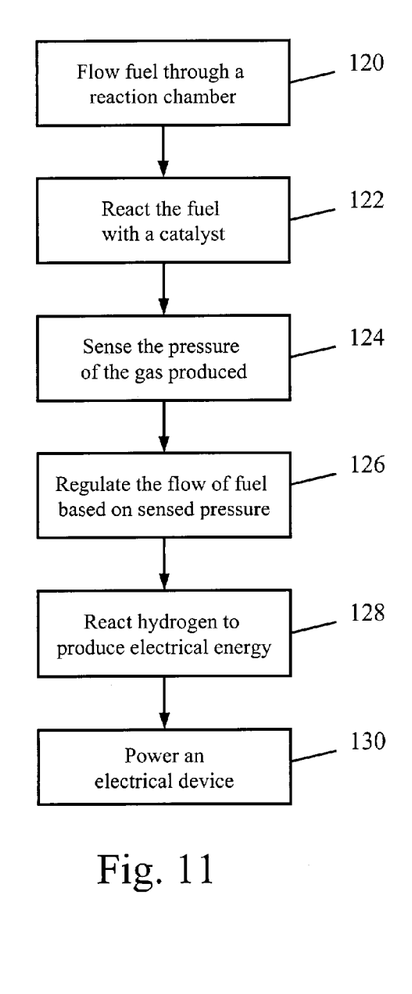
FIG. 11 illustrates an exemplary method of operating a fuel cell with the inventive hydrogen productive system.

FIG. 11 is a flow chart, illustrating a method of utilizing the inventive hydrogen production system (41, 51, 61, 71, 81, 91, 101) to power a portable electrical device 36. The method includes flowing a fuel through a reaction chamber 120 and reacting the fuel with a catalyst to produce hydrogen gas 122. The pressure of the hydrogen gas is sensed 124 and based on this sensed pressure, the flow of fuel is regulated to the reaction chamber 126. The sensed pressure could be an absolute pressure or referenced to the reaction chamber inlet or outlet pressures. The hydrogen that is produced is then reacted in a fuel cell to produce electrical energy 128. There are a number of different fuel cells that could be used to create react the hydrogen gas including: proton exchange membrane (PEM) fuel cells, alkaline fuel cells (AFC), phosphoric-acid fuel cells (PAFC), solid oxide fuel cells (SOFC) and molten carbonic fuel cells (MCFC). Lastly, the electrical energy produced is used to power an electrical device 130 which might include: a computer or computational device, cell phone, personal digital assistant, portable power tool or any other hand held electrical device.

While the present invention has been shown and described with reference to the foregoing preferred and alternate embodiments, those skilled in the art will understand that many variations may be made therein without departing from the spirit and scope of the invention as defined in the following claims.

This description of the invention should be understood to include all novel and non-obvious combinations of elements described herein, and claims maybe presented in this or a later application to any novel and non-obvious combination of these elements. The foregoing embodiments are illustrative, and no single feature or element is essential to all possible combinations that maybe claimed in this or a later application. Where the claims recite "a" or "a first" element of the equivalent thereof, such claims should be understood to include incorporation of one or more such elements, neither requiring nor excluding two or more such elements.

What is claimed:

1. A production system comprising:
   a reaction chamber having an inlet and outlet;
   a gas collection chamber disposed proximate the reaction chamber and receiving gas produced in said reaction chamber; and
   a regulator coupled to the gas collection chamber;
   wherein the regulator selectively physically obstructs the flow of a reactant to the reaction chamber in response to pressure in the gas collection chamber.

2. The system of claim 1, wherein the regulator regulates the reaction chamber inlet.

3. The system of claim 1, wherein the regulator regulates the reaction chamber outlet.

4. The system of claim 1, wherein the reaction chamber contains a catalyst.

5. The system of claim 1, wherein the reactant comprises an aqueous metal hydride solution.

6. The system of claim 5, wherein the aqueous metal hydride solution comprises sodium borohydride.

7. The system of claim 1, wherein the reactant comprises hydrogen peroxide.

8. The system of claim 1, wherein the regulator comprises a diaphragm seal.

9. The system of claim 1, wherein the regulator comprises a poppet valve.

10. The system of claim 1, wherein the regulator comprises a rocker valve.

11. The system of claim 1, wherein the regulator comprises an inflatable bag.

12. The system of claim 1, wherein the regulator comprises a pressure transducer, controller and an electromechanical valve.

13. A fuel cell system comprising:
    an anode;
    a cathode;
    a proton exchange membrane disposed between the anode and cathode; and
    the production system of claim 1 coupled to the anode.

14. The fuel cell system claim 13, wherein the reactant comprises an aqueous metal hydride solution.

15. A fuel cell system comprising:
    an anode;
    a cathode;
    a proton exchange membrane disposed between the anode and cathode; and
    the production system of claim 1 coupled to the cathode.

16. The fuel cell system claim 15, wherein the reactant comprises hydrogen peroxide.

17. The system of claim 1, wherein the gas collection chamber contains at least a portion of the reaction chamber.

18. The system of claim 1, wherein the gas collection chamber is sized in proportion to gas demands of a device supplied with gas by said system.

19. The system of claim 18, wherein said gas comprises hydrogen and said device comprises a fuel cell.

20. The system of claim 1, wherein movement of said regulator to physically obstruct said flow of reactant is caused by said pressure in said gas collection chamber.

21. The system of claim 1, wherein the regulator comprises a spring that is selectively compressed by pressure in the gas collection chamber so as to regulate a flow of a reactant to the reaction chamber.

22. The system of claim 21, wherein the regulator comprises a double piston that drives said reactant into said reaction chamber unless opposed by said pressure in said gas collection chamber.

23. The system of claim 21, wherein the regulator comprises a piston pump that drives said reactant into said reaction chamber unless opposed by said pressure in said gas collection chamber.

24. The system of claim 21, wherein said regulator further comprises an inflatable bag that is in communication with said gas collection chamber and inflated by an increase in pressure in said gas collection chamber, said inflatable bag, when inflated, compressing said spring to prevent said spring from forcing said reactant into said reaction chamber.

25. The system of claim 21, wherein compression of said spring forces closed an outlet of said reaction chamber thereby preventing additional reactant from flowing into an inlet of said reaction chamber.

26. The system of claim 21, wherein compression of said spring forces waste products that have exited said reaction chamber passed a first check valve and closes a second check valve to close said outlet of said reaction chamber.

* * * * *

UNITED STATES PATENT AND TRADEMARK OFFICE
CERTIFICATE OF CORRECTION

| | | |
|---|---|---|
| PATENT NO. | : 7,544,431 B2 | Page 1 of 1 |
| APPLICATION NO. | : 10/412569 | |
| DATED | : June 9, 2009 | |
| INVENTOR(S) | : John A deVos et al. | |

It is certified that error appears in the above-identified patent and that said Letters Patent is hereby corrected as shown below:

In column 8, line 38, in Claim 14, after "system" insert -- of --.

In column 8, line 47, in Claim 16, after "system" insert -- of --.

Signed and Sealed this

Twenty-ninth Day of September, 2009

David J. Kappos
*Director of the United States Patent and Trademark Office*